(12) United States Patent
Chuang

(10) Patent No.: US 8,480,426 B2
(45) Date of Patent: Jul. 9, 2013

(54) BATTERY CONNECTING TABS

(75) Inventor: Ming-Te Chuang, Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 290 days.

(21) Appl. No.: 12/797,051

(22) Filed: Jun. 9, 2010

(65) Prior Publication Data

US 2011/0303459 A1    Dec. 15, 2011

(51) Int. Cl.
*H01R 3/00* (2006.01)

(52) U.S. Cl.
USPC .......................................... 439/500; 429/158

(58) Field of Classification Search
USPC ................... 439/500, 627, 504; 429/158, 160
See application file for complete search history.

(56) References Cited

U.S. PATENT DOCUMENTS

| | | | | |
|---|---|---|---|---|
| 5,312,269 | A * | 5/1994 | Hwang | 439/500 |
| 7,270,576 | B2 * | 9/2007 | Kim et al. | 439/627 |
| 7,316,863 | B2 * | 1/2008 | Sato | 429/158 |
| 7,638,237 | B2 * | 12/2009 | Ha et al. | 429/152 |
| 7,935,438 | B2 * | 5/2011 | Kim | 429/160 |
| 2006/0194101 | A1 * | 8/2006 | Ha et al. | 429/158 |
| 2010/0081048 | A1 * | 4/2010 | Nansaka et al. | 429/158 |

\* cited by examiner

*Primary Examiner* — Thanh Tam Le
(74) *Attorney, Agent, or Firm* — Muncy, Geissler, Olds & Lowe, PLLC

(57) ABSTRACT

The invention relates to a battery connecting tabs for electrically connecting a plurality of batteries. The battery connecting tabs include a first layer and a second layer adhered to the first layer. The second layer is physically and electrically connected to the first layer, and the second layer has a plurality of holes formed thereon, wherein the conductivity of the second layer is higher than the first layer, the thickness of the second layer is thicker than the first layer, and the first layer is physically and electrically connected to electrodes of the batteries.

9 Claims, 8 Drawing Sheets

BATTERY CONNECTING TABS

BACKGROUND OF THE INVENTION

1. Field of the Invention

The invention relates to battery connecting tabs and in particular to battery connecting tabs made of two different materials.

2. Description of Prior Art

Batteries are commonly used in portable devices. It is necessary to connect a plurality of batteries in series or parallel, forming a high current charging and discharging battery module, for supplying a required power of large electronic equipment, such as electric cars. Generally, one of the methods for connecting batteries in series or parallel is to use connecting tabs connecting across the electrodes of adjacent two batteries, and form a current loop by welding the connecting tabs to batteries.

Please refer to FIG. 8. FIG. 8 shows schematically a perspective view of the battery connecting tabs connecting with the batteries of prior art. A battery 200 case (including electrodes) is generally made of pure nickel, iron plated by nickel or aluminum for preventing the active materials contained in the battery 200 to contact directly to the external materials. It has an advantage of easily welding electrodes 210 and battery connecting tabs 100 when the connecting tabs 100 uses the same material with the case of the battery 200. However, the conductivity of pure nickel, iron plated by nickel or aluminum is poor, they are not suitable to use in the high current charging and discharging battery module.

Battery connecting tabs 100 made of copper are usually used in the high current charging and discharging battery module due to their excellent conductivity. Because of the need of supplying battery module high current at the time of charging and discharging, it is required to increase the thickness of battery connecting tabs made of copper for upgrading the conductivity. However, it may cause the welding difficulty of the battery 200 and the battery connecting tabs 100 as the thickness of the battery connecting tabs increases. The main reason is that the thickness of the battery connecting tabs 100 is increased, the higher welding current is required, and the greater stress is also needed, and thus it is difficult to control process parameters. Also, the thermal energy provided by a specific welding temperature is not easy to concentrate because of the large heat dissipation area, which causes that the welding quality is difficult to control.

Moreover, copper may soon dissipate the heat on its surface when welding due to its good thermal conductivity. Therefore, it causes a problem that the heat can not be concentrated on a specific area of the surface of copper when welding, and it is difficult to weld by copper.

Thus, it would be highly desirable to have battery connecting tabs 100 which have excellent electrical conductivity and thermal conductivity, and are easy to connect with batteries 200 which are used in a high current charging and discharging battery module.

SUMMARY OF THE INVENTION

To solve the above deficiencies of prior art, an aspect of the present invention is that to provide battery connecting tabs for connecting a plurality of batteries in series or parallel to form a current loop, and having the advantages of excellent electrical conductivity and thermal conductivity, and easy to connect with batteries.

The battery connecting tabs are used for electrically connecting a plurality of batteries. The battery connecting tabs include a first layer and a second layer adhered to the first layer. The second layer is physically and electrically connected to the first layer, and the second layer has a plurality of holes formed thereon, wherein the conductivity of the second layer is higher than the first layer, the thickness of the second layer is thicker than the first layer, and the first layer is physically and electrically connected to electrodes of the batteries.

The present invention provides battery connecting tabs which are formed by connecting two metal materials with different thickness and features. The battery connecting tabs may not only reduce the welding difficulty of batteries and connecting tabs, but also through which a high current may pass and the heat soon dissipate at the time of charging and discharging batteries.

DETAILED DESCRIPTION OF THE INVENTION

A preferred embodiment of the present invention will be described with reference to the drawings.

Figure 1:
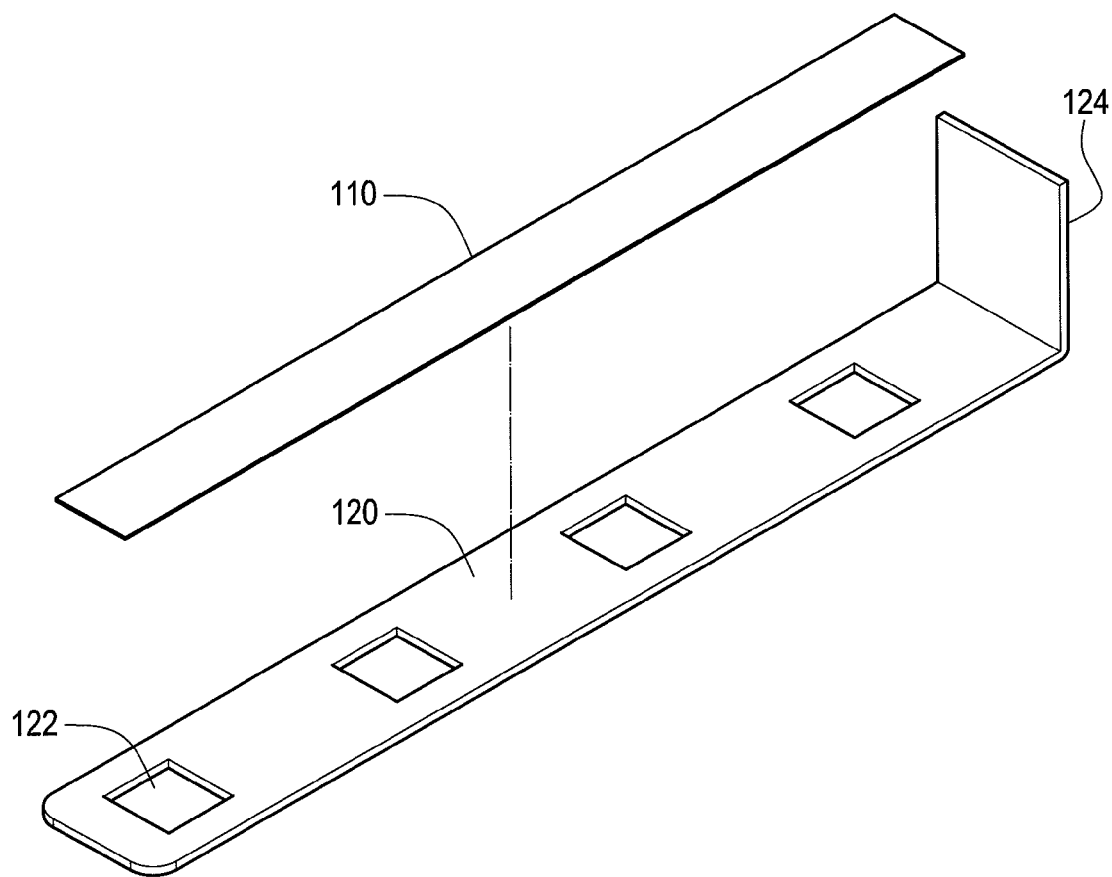
FIG. 1 shows an exploded view of battery connecting tabs according to a first preferred embodiment of the present invention.

Please refer to FIG. 1. FIG. 1 shows an exploded view of battery connecting tabs according to a first preferred embodiment of the present invention. Battery connecting tabs 10 are used for electrically connecting a plurality of batteries to form a current loop for charging and discharging the batteries. The battery connecting tabs 10 include a first layer 110 and a second layer 120. Both of the first layer 110 and the second layer 120 are made of metal.

The second layer 120 has a plurality of holes 122 formed thereon to enhance the thermal dissipation effect of the second layer 120 by heat convection. The first layer 110 is adhered to a surface of the second layer 120, and seals the holes 122. The second layer 120 is physically and electrically connected to the first layer 110.

The first layer 110 is used for electrically connecting to the batteries 20 to provide a current loop for charging and discharging the batteries 20. The second layer 120 is used as a path through which the high current may pass when charging and discharging the batteries 20, and providing a thermal conductive path for the batteries 20.

Figure 2:
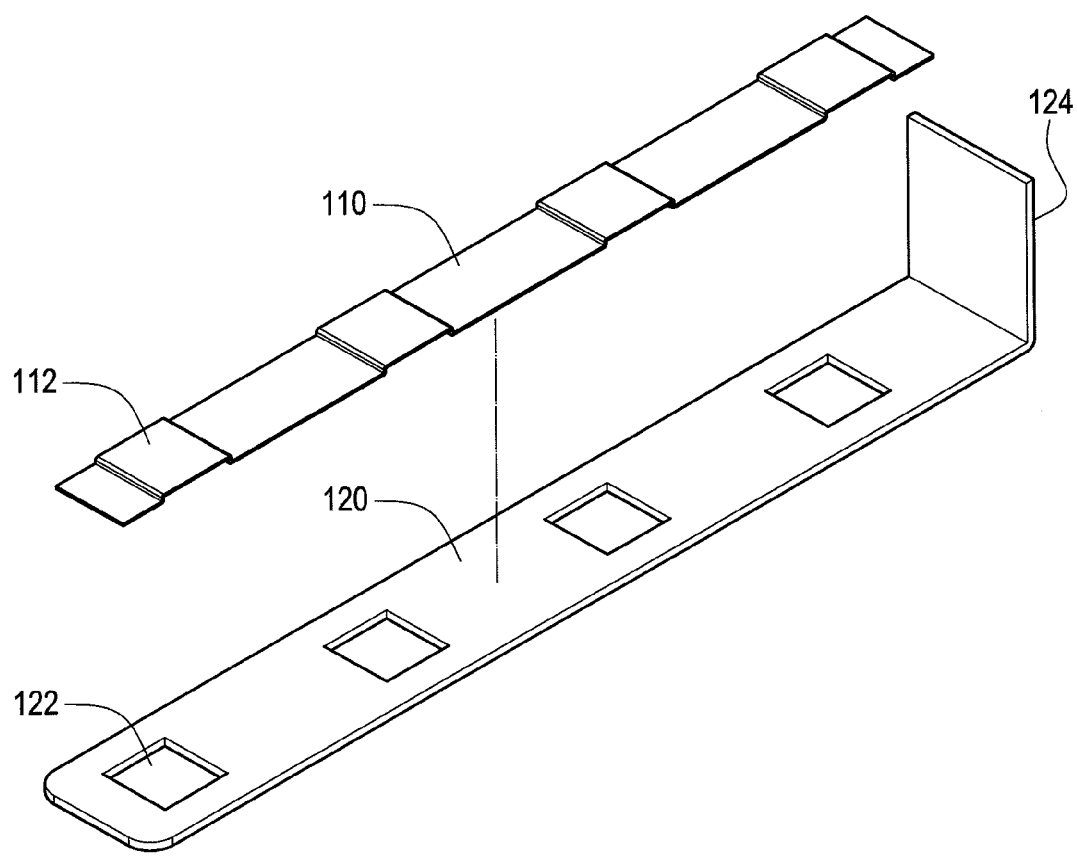
FIG. 2 shows an exploded view of battery connecting tabs according to a second preferred embodiment of the present invention.
Figure 3:
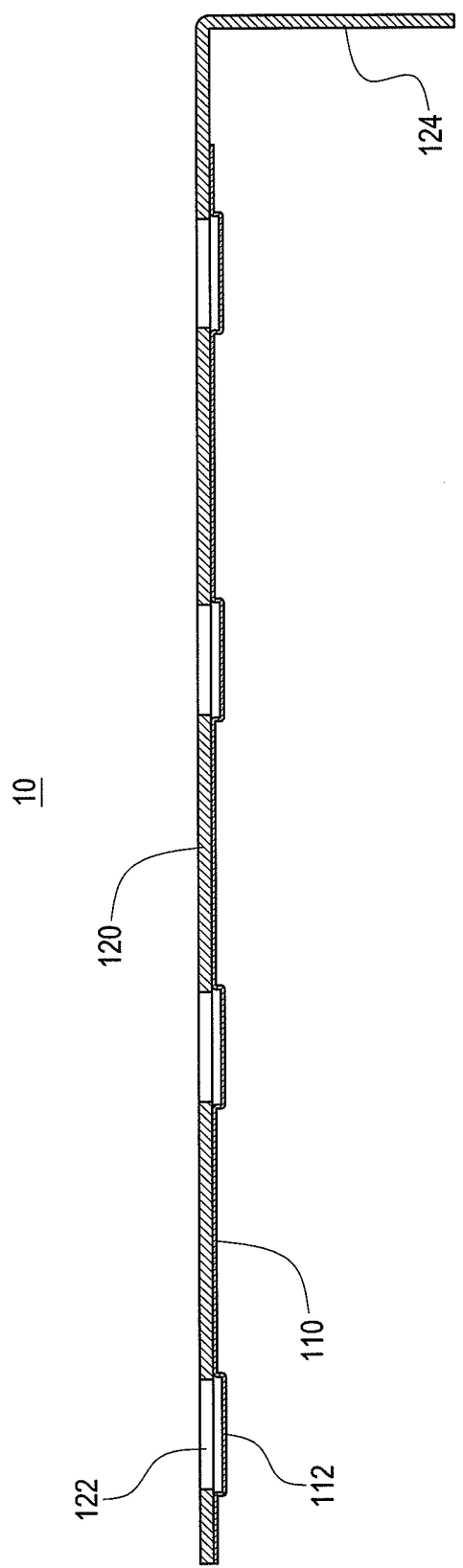
FIG. 3 shows a cross sectional view of battery connecting tabs according to the second preferred embodiment of the present invention.

Please refer to FIGS. 2 and 3. FIGS. 2 and 3 respectively show an exploded view and cross sectional view of battery connecting tabs according to a second preferred embodiment of the present invention. The battery connecting tabs 10 include a first layer 110 and a second layer 120. Both of the first layer 110 and the second layer 120 are made of metal, and the first layer 110 has a plurality of projection portions 112 formed thereon.

The first layer 110 is adhered to a surface of the second layer 120, and connecting physically and electrically each other. The second layer 120 has a plurality of holes 122 formed thereon, and the holes 122 are disposed and corresponded to the projection portions 112. The projection portions 112 protrude in an opposite direction of the holes 122. In addition, the second layer 120 further includes a bend 124 for electrically connecting to an external circuit board.

Figure 4:
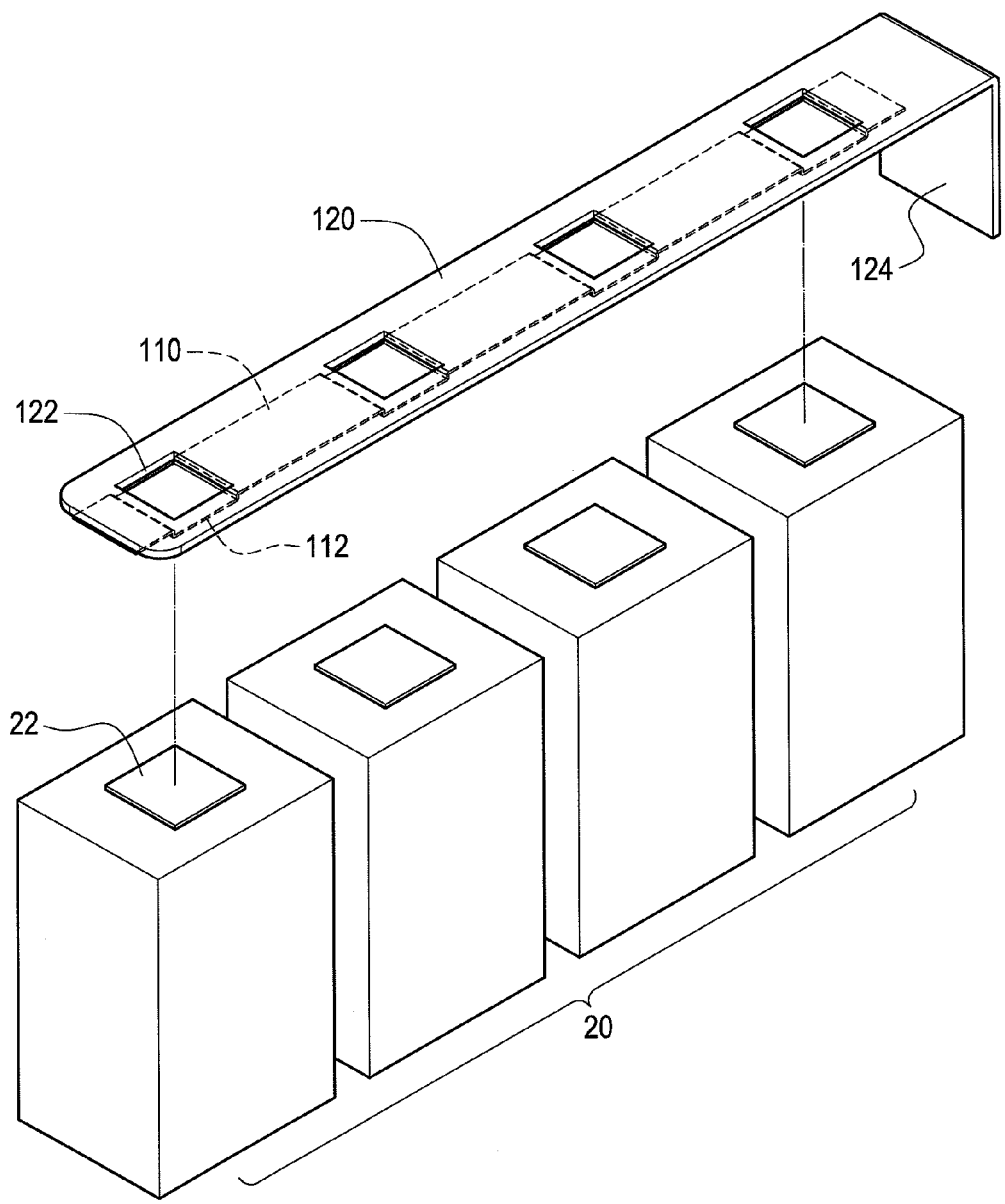
FIG. 4 shows schematically battery connecting tabs connecting with the batteries according to the second preferred embodiment of the present invention.
Figure 5:
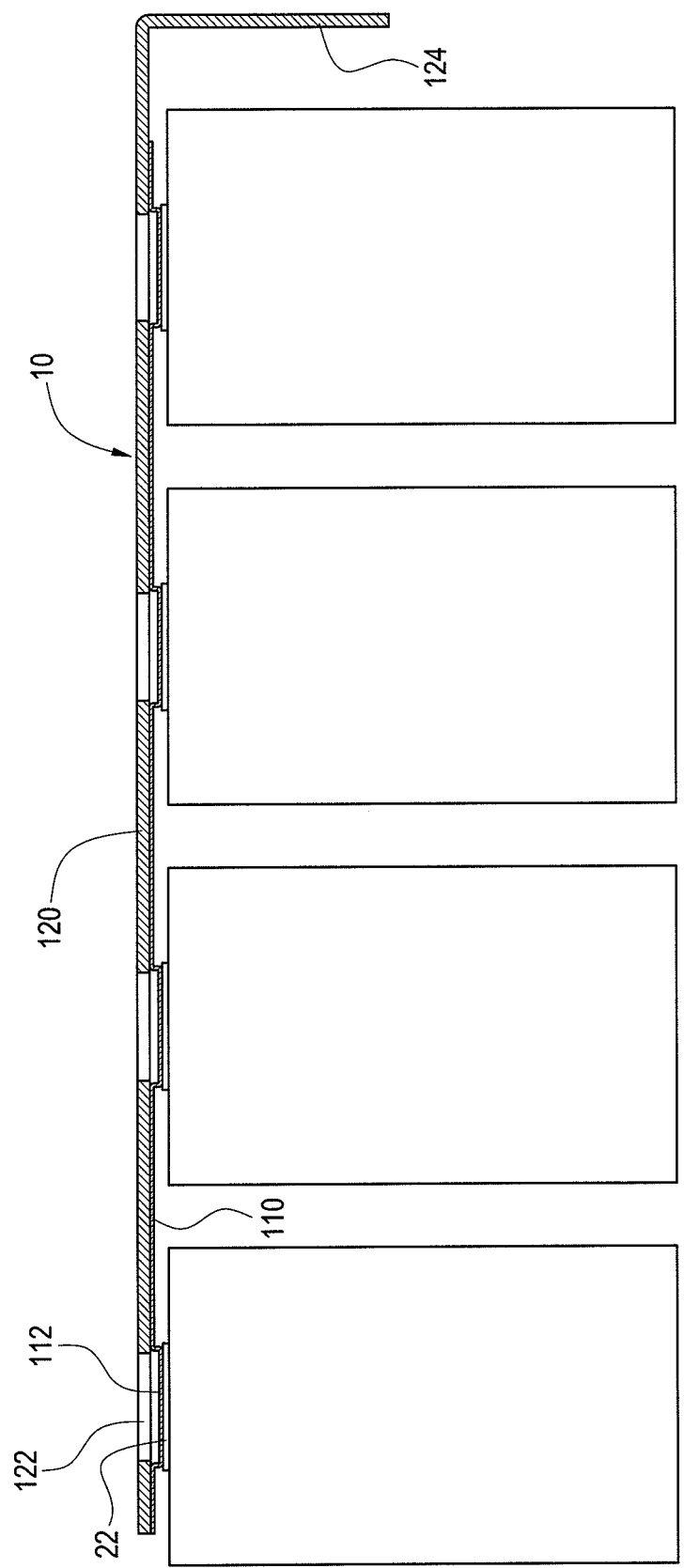
FIG. 5 shows a cross section view of battery connecting tabs connecting with the batteries according to the second preferred embodiment of the present invention.

Please refer to FIGS. 4 and 5. FIGS. 4 and 5 respectively show a state of use and cross section view of battery connecting tabs connecting with the batteries according to the present invention. A first layer 110 may be a sheet of ferromagnetism, such as Fe, Co, Ni and Ni alloy. In the present embodiment, the first layer 110 is pure nickel. The projection portions 112 of the first layer 110 are used for physically and electrically connecting to the electrodes 22 of the batteries 20 to provide a current loop for charging and discharging the batteries 20, wherein the method for connecting the first layer 110 and the batteries 20 may be resistance welding, spot welding, soldering or ultrasonic welding. In the present embodiment, the method for physically connecting the first layer 110 and the batteries 20 is spot welding, and the thickness of the first layer 110 should not be excessively thick, the most preferred thickness having a range from 0.1 to 0.3 mm.

The second layer 120 is a sheet of copper-based metal, which has excellent electrical conductivity and thermal conductivity, such as Cu, Ag and Au. In the present embodiment, the second layer 120 is red copper. The second layer 120 is used as a path through which the high current may pass when charging and discharging the batteries 20, and providing a thermal conductive path for the batteries 20. To achieve the excellent electrical and thermal conductive effect, the thickness of the second layer 120 is thicker than that of the first layer 110, i.e. the thickness of the second layer 120 have to be greater than 0.3 mm. The holes 122 act as a passage through which the air fluid may pass so as to enhance the thermal dissipation effect of the second layer 120 by heat convection. Furthermore, the holes 122 are also a window used for spot welding the raised portions 112 of the first layer 110 and the batteries 20. The welding tool contacts the projection portions 112 through the holes 122 to weld the raised portions 112 to the batteries 20.

By adhering the first layer 110 and the second layer 120 with different thickness each other, physically and electrically connecting the relative thin first layer 110 and the batteries 20, it may easy to weld the batteries 20 and the battery connecting tabs 10. Also, the use of relative thick second layer 120 adhered to the first layer 110 may enhance the electrical conductivity of the whole battery connecting tabs 10, and providing the holes 122 of the second layer 120 may enhance thermal dissipation effect of the whole battery connecting tabs 10.

Figure 6:
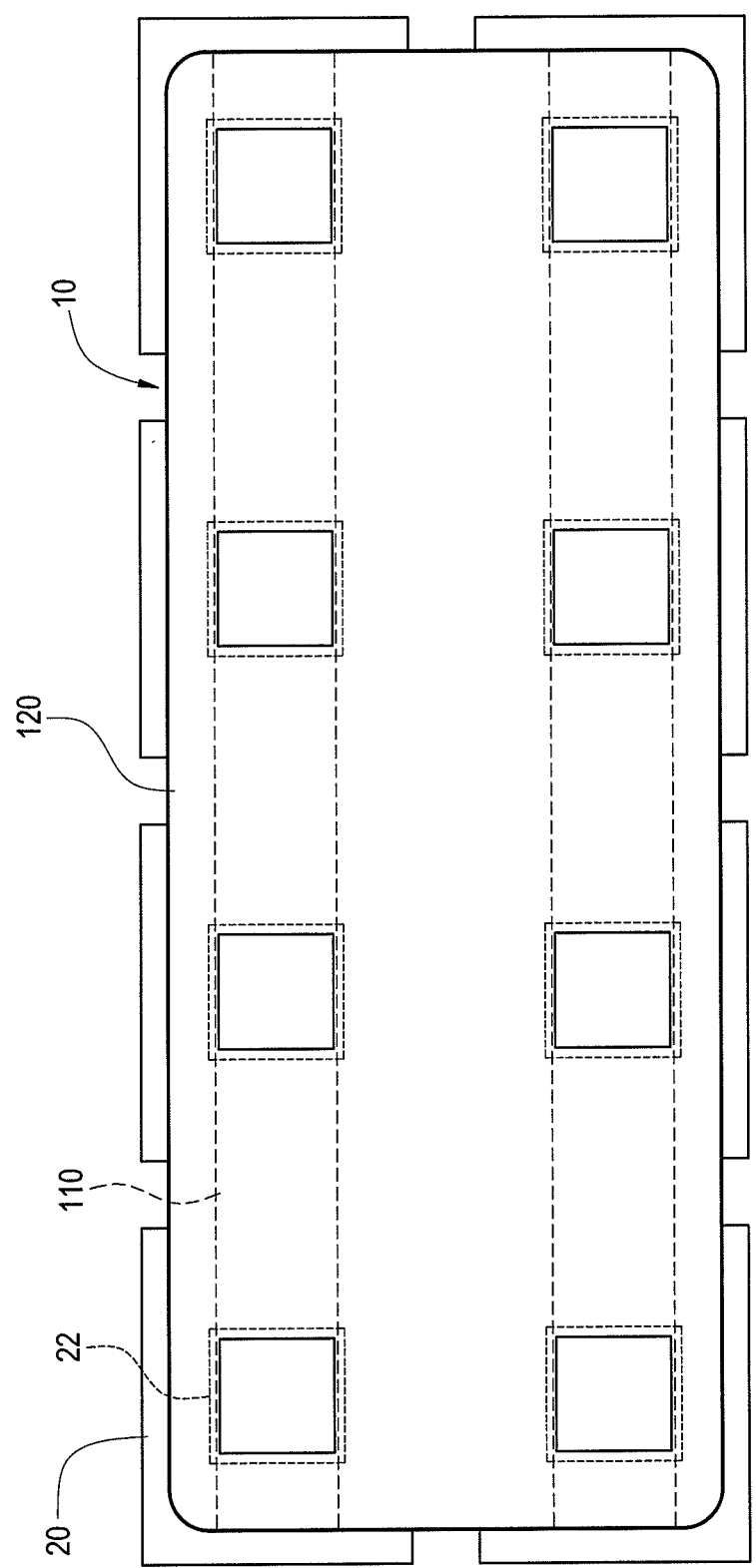
FIG. 6 shows a state of use of battery connecting tabs according to a third embodiment of the present invention.

Please refer to FIG. 6. FIG. 6 shows a state of use of battery connecting tabs according to a third embodiment of the present invention. The second layer 120 has a plurality of holes 122 located in juxtaposition manner thereon, and the holes 122 correspond to a plurality of raised portions 112 of two first layers 110. The projection portions 112 are physically and electrically connected to the batteries 20, so as to provide a higher voltage or greater electric capacity.

Figure 7:
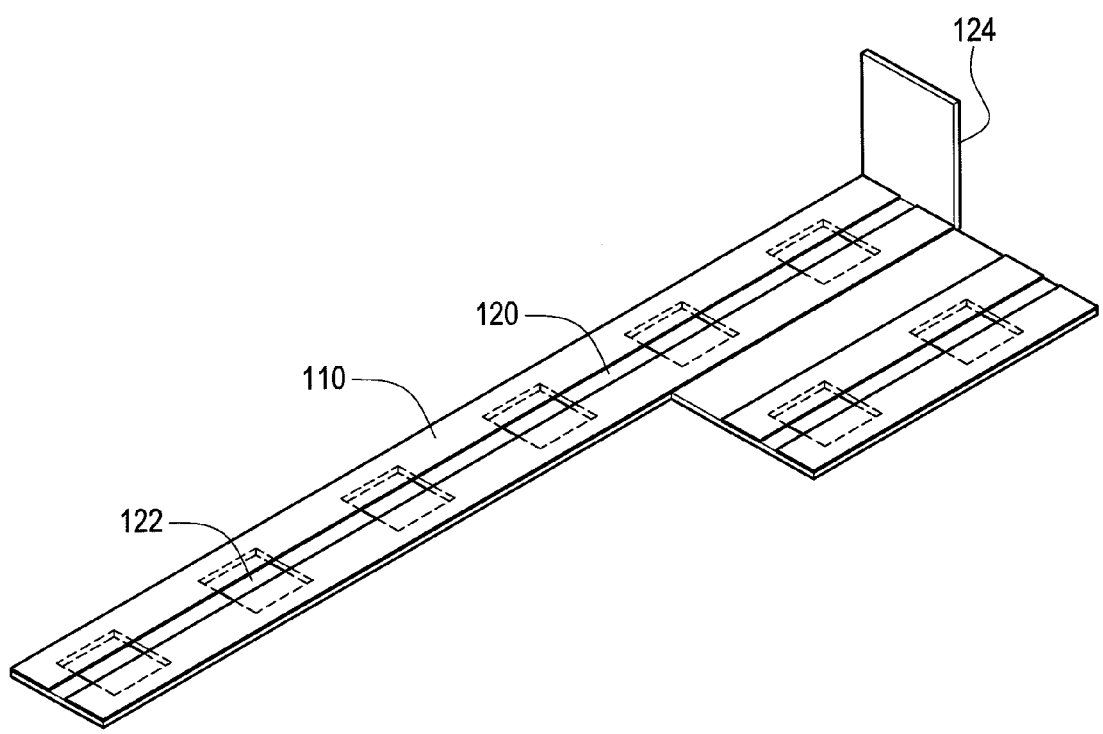
FIG. 7 shows schematically a perspective view of battery connecting tabs according to a fourth embodiment of the present invention.
Figure 8:
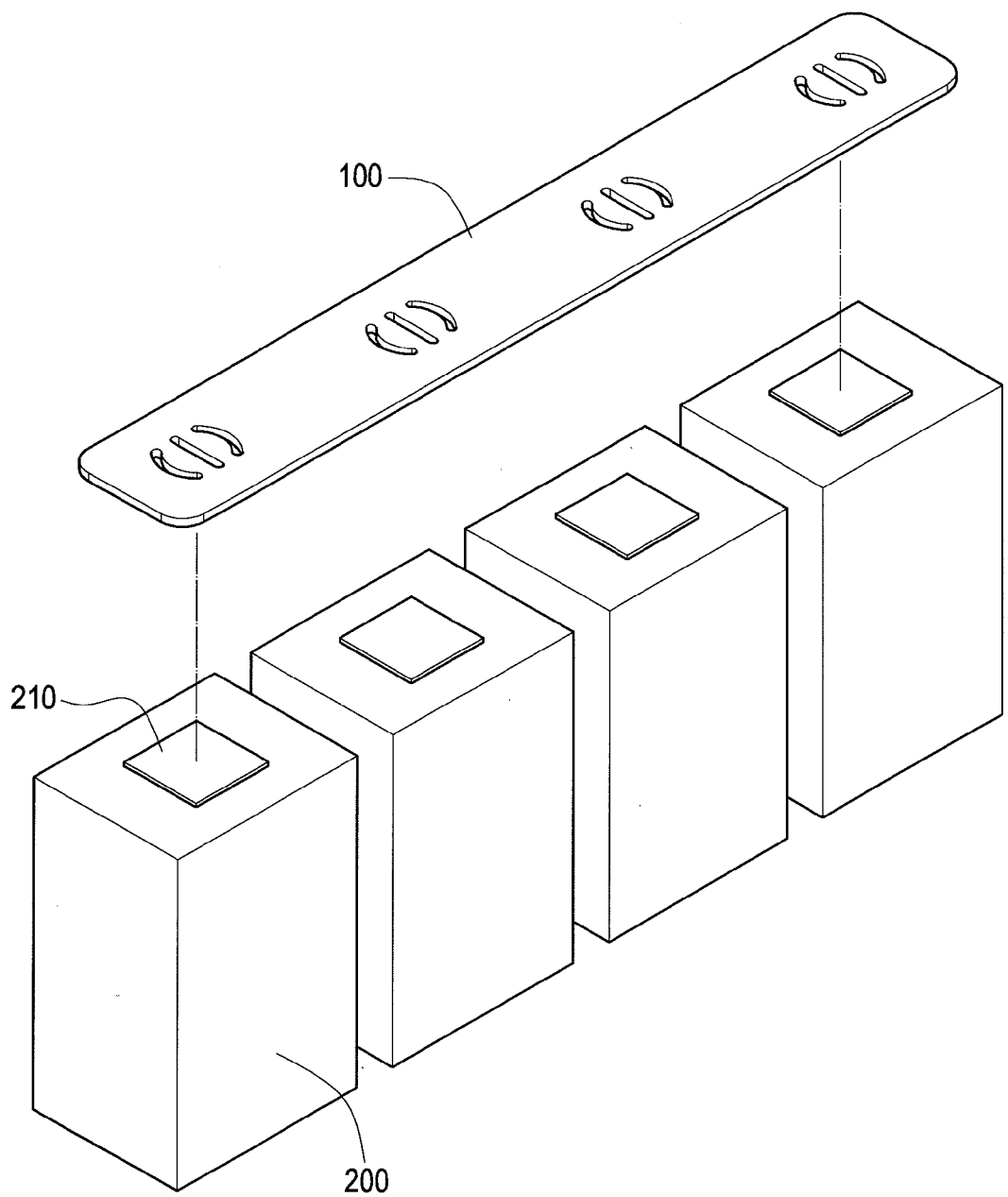
FIG. 8 shows schematically a perspective view of battery connecting tabs of prior art.

Please refer to FIG. 7. FIG. 7 shows schematically a perspective view of battery connecting tabs according to a fourth embodiment of the present invention. The battery connecting tabs 10 include two first layers 110 and a second layer 120. The two first layers 110 are physically and electrically connected a plurality of batteries 20 respectively, and the second layer 120 has a plurality of holes 122 formed thereon. The two first layers 110 are adhered on a surface of the second layer 120, and the two first layers 110 partially covered the holes 122 respectively.

In the present embodiment, there have two first layers 110 physically connected to the batteries 20 respectively. Compared to a single first layer 110 disclosed in the above embodiments, the first layer 110 of the present embodiment has an overall larger resistance. The current would select a flowing path having a lower resistance by nature. Thus, in the present embodiment, the current of charging and discharging the batteries may flow rapidly towards to the second layer 120 through the first layer 110, and deliver to outside from the bend 124 of the second layer 120.

Moreover, the battery connecting tabs 10 may comprise a second layer 120 and a plurality of first layers 110 arranged in parallel and matched with the second layer 120. Alternatively, a large battery module may be formed by properly arranging the battery connecting tabs of the first embodiment and the battery connecting tabs of the second embodiment.

In summary, the present invention provides battery connecting tabs which are formed by connecting two kinds of sheets with different thickness and features. The relative thin sheet with the similar material to the battery case may be used as a welding material to connect with the battery. The battery connecting tabs may effectively reduce the welding difficulty of batteries and connecting tabs. The relative thick sheet with low resistance, which has excellent electrical conductivity and thermal conductivity, may be used as a path through which a high current may pass and the heat soon dissipate at the time of charging and discharging the batteries.

As the skilled person will appreciate, various changes and modifications can be made to the described embodiments. It is intended to include all such variations, modifications and equivalents which fall within the scope of the invention, as defined in the accompanying claims.

What is claimed is:

1. Battery connecting tabs for electrically connecting a plurality of batteries at electrodes, the battery connecting tabs comprising:
   a first layer;
   a second layer adhered to the first layer, the second layer physically and electrically connected to the first layer, and the second layer having a plurality of holes thereon; and
   wherein the first and second layers are metal, and the conductivity of the second layer is higher than the first layer, the thickness of the second layer is thicker than the first layer, and the first layer is physically and electrically connected to the electrodes of the batteries; and
   wherein the first layer has a plurality of raised portions formed thereon, the raised portions corresponding to the holes and connecting to the electrodes of the batteries.

2. The battery connecting tabs of claim 1 wherein the raised portions protrude in an opposite direction of the holes.

3. The battery connecting tabs of claim 1 wherein the second layer further includes a bent portion at a distal end thereof.

4. The battery connecting tabs of claim 1 wherein the first layer is a metal of ferromagnetism.

5. The battery connecting tabs of claim 4 wherein the first layer is nickel.

6. The battery connecting tabs of claim 1 wherein the second layer is a copper-based metal.

7. The battery connecting tabs of claim 6 wherein the second layer is red copper.

8. The battery connecting tabs of claim 1 wherein the first layer has a thickness of a range from 0.1 to 0.3 mm.

9. The battery connecting tabs of claim 1 wherein the battery connecting tabs comprise two first layers respectively disposed on the second layer, and the two first layers partially covering the holes.

* * * * *